United States Patent
Takemura

(10) Patent No.: US 6,709,164 B2
(45) Date of Patent: Mar. 23, 2004

(54) TAPERED ROLLER BEARING

(75) Inventor: Hiromichi Takemura, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/118,851

(22) Filed: Apr. 9, 2002

(65) Prior Publication Data

US 2002/0176642 A1 Nov. 28, 2002

(30) Foreign Application Priority Data

Apr. 12, 2001 (JP) .................................... 2001-114119

(51) Int. Cl.⁷ .................................................... F16C 33/34
(52) U.S. Cl. .................... 384/568; 384/569; 384/450
(58) Field of Search ................................ 384/568, 569, 384/565, 450, 548, 558

(56) References Cited

U.S. PATENT DOCUMENTS

| | | | |
|---|---|---|---|
| 3,910,656 A | | 10/1975 | Price et al. |
| 3,990,753 A | * | 11/1976 | Kellstrom et al. ........... 384/450 |
| 4,456,313 A | * | 6/1984 | Hartnett et al. ............. 384/565 |
| 4,557,613 A | | 12/1985 | Tallian et al. |
| 4,705,411 A | * | 11/1987 | Kellstrom ................... 384/450 |
| 4,783,181 A | * | 11/1988 | Takata ........................ 384/450 |
| 4,802,775 A | * | 2/1989 | Takata ........................ 384/450 |
| 4,828,404 A | | 5/1989 | Takata |
| 4,929,098 A | * | 5/1990 | Takata et al. ................ 384/450 |
| 5,800,072 A | * | 9/1998 | Buch et al. .................. 384/568 |
| 6,227,711 B1 | * | 5/2001 | Kellstrom et al. .......... 384/450 |
| 6,296,395 B1 | * | 10/2001 | Brand et al. ................. 384/558 |
| 6,315,458 B1 | | 11/2001 | Unno et al. |

FOREIGN PATENT DOCUMENTS

| | | |
|---|---|---|
| DE | 1 163 612 | 2/1964 |
| JP | 05-149329 | 6/1993 |
| JP | 11-101229 | 4/1999 |
| JP | 2001-12453 | 11/1999 |
| JP | 2000-074075 | 3/2000 |
| WO | 96/17179 | 6/1996 |
| WO | 98/48189 | 10/1998 |
| WO | 99/14509 | 3/1999 |

* cited by examiner

Primary Examiner—David A. Bucci
Assistant Examiner—Julie K. Smith
(74) Attorney, Agent, or Firm—Katten Muchin Zavis Rosenman

(57) ABSTRACT

A tapered roller bearing comprises: an outer race 12 having a raceway surface 21; an inner race 11 having a raceway surface 20; and a plurality of rolling elements 15 located between the raceway surfaces and formed by third generatrices having a fixed radius of curvature R3 such that the rolling contact surface is convex in the axial direction; and where the center section 20a, 21a of the raceway surfaces 20, 21 is formed by first generatrices having a fixed radius of curvature R1 in an axially concave-shape, and the opposite ends 20b, 21b in the axial direction adjacent to the center section 20a, 21a are formed by second generatrices having a fixed radius of curvature R2 such that they separate from the rolling contact surface of the rolling element 15; and where the radius of curvature R3 of the third generatrices surface satisfies Equation [1] below.

$R3 = s \times R1$ wherein $0.65 \leq s \leq 0.95$     Eq. [1].

3 Claims, 3 Drawing Sheets

TAPERED ROLLER BEARING

BACKGROUND OF THE INVENTION

1. Field of the Invention

This invention relates to a tapered roller bearing that is used, for example in the transfer or differential gear mechanism for a manual transmission (M/T) or automatic transmission (A/T) of an automobile, and more particularly to a tapered roller bearing that is capable of suppressing the generation of edge loading when the axis of the outer race crosses the axis of the inner race, and lengthening the life of the bearing.

2. Description of the Related Art

In the case of a roller bearing having a plurality of cilindrical or tapered rolling members (called rollers below), when the axis of the outer race and the axis of the inner race shift such that they cross with each other, a rise in localized contact pressure (edge load) is generated on one side of the contact area between the raceway of the outer race and the rollers or between the raceway of the inner race and the rollers or both, and there is a possibility that this edge loading could cause early damage to the bearing. In addition, when installing the roller bearing into an apparatus, it is necessary to line up the axis of the outer race with the axis of the inner race with high precision. However, when there is a possibility that as the rotating shaft bends due to large axial loads, these axes will shift.

For example, when the tapered roller bearing that is used in the output-shaft side of the transaxial (mechanism which houses the clutch, transmission and reduction gear in the same housing) for the M/T or A/T of an automobile is misaligned (for example, in a state where the axis of the outer race crosses the axis of the inner race) due to excessive loading from the reaction force of the output shaft gear or due to a decrease in rigidity of the housing, edge loading may occur at the end of the raceway surface or end of the roller to shorten the life of the bearing.

In order to avoid this kind of problem, the operating conditions of the bearing were improved instead of improving the tapered roller bearing itself. For example, the allowable inclination angle of the tapered roller bearing was made to be 0.0009 radians (3 minutes), and so the installation tolerance was regulated, so that no excessive loading occurred, or a high-precision housing or/and shaft was used.

On the other hand, methods of treating the tapered roller bearing itself, such as using a tapered roller bearing for which crowning processing, such as full crowning or partial crowning, was performed on each of the raceway surfaces or on each of the rolling contact surfaces of the rollers or on both, was also considered. In this case, the crowning process is a process of forming a very small taper or curve on the generatrix of the raceway surface or rolling contact surface.

However, in the case of a tapered roller bearing on which crowning has been performed, it is necessary to make small the radius of curvature of the crowning in order that edge loading does not occur between the raceway surface and rolling contact surface when there is a large angle of shift between the axes. However, by doing this, when the angle of shift between the axes is small, or when there is no shift between the axes, there was a problem in that the surface pressure in the center of the contact area between each of the raceways and rollers becomes high when compared to when crowning is not performed or when the radius of curvature of crowning is large.

Japanese patent publication No. Toku Kai 2000-74075 discloses a tapered roller bearing that is capable of relieving the surface pressure between the raceway surface and each of the rolling contact surfaces in the case when the angle of shift between the axes of the outer race and inner race is small, and suppressing edge loading from occurring in both the case when the angle of shift between the axes of the outer race and inner race is large and also when it is small. This tapered roller bearing is defined by a generatrix having a radius of curvature such that one of the opposite ends of the raceway surfaces of the inner and outer races and the opposite ends of the rolling contact surfaces of the rollers separates from the other.

However, in the case of this bearing, there was a concern that the surface pressure in the center of the contact area between each of the raceway surfaces and the rolling contact surfaces of the rollers would increase when the angle of shift between the axes of the outer and inner races was large.

Therefore, as a result of zealous investigation by the inventors, it was found that in the case of the tapered roller bearing disclosed in Japanese Patent Publication No. Toku Kai 2000-74075, it was possible to suppress edge loading, as well as suppress an increase of surface pressure in the center of the contact area between the raceway surfaces and rolling contact surfaces due to misalignment, by setting an optimum curvature for the raceway surfaces.

SUMMARY OF THE INVENTION

It is the object of this invention to provide a tapered roller bearing that is capable of suppressing edge loading, as well as suppressing an increase of surface pressure in the center of the contact area between the raceway surfaces and rolling contact surfaces of the rollers, even when the angle of shift between the axes of the outer and inner races is large.

DESCRIPTION OF THE PREFERRED EMBODIMENTS

Figure 1:
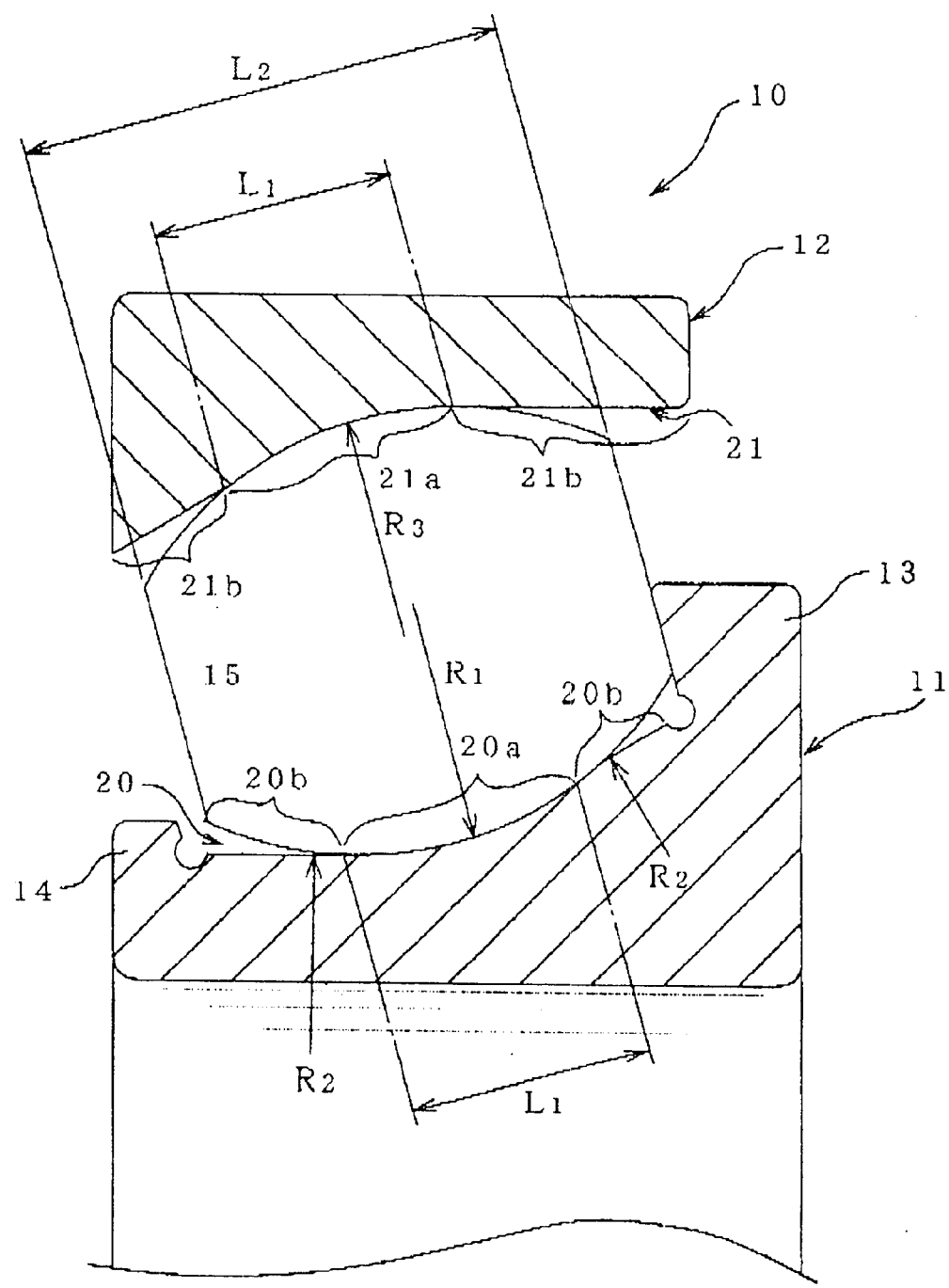
FIG. 1 is a partial cross sectional view of a first embodiment of the present invention where a tapered roller bearing 10 is shown.

In order to accomplish the aforementioned object, the tapered roller bearing of this invention comprises: an outer race having a raceway surface formed around its inner peripheral surface such that it is concave in the axial direction; an inner race having a raceway surface formed around its outer peripheral surface such that it is concave in the axial direction; and a plurality of rolling elements that are located between the raceway surfaces and defined by third generatrices having a fixed radius of curvature R3 such that the rolling contact surface is convex in the axial direction; and where the center section of the raceway surfaces is defined by first generatrices having a fixed radius of curvature R1 in an axially concave-shape, and the axially opposite ends adjacent to the center section are defined by second generatrices having a fixed radius of curvature R2 such that they separate with respect to the rolling contact surface of the rolling element; and where the radius of curvature R3 of the rolling contact surface satisfies Equation [1] below.

$$R3 = s \times R1 \text{ where } 0.65 \leq s \leq 0.95 \qquad \text{Eq. [1]}$$

The 'Genratrices' referred to here are lines that are drawn by the raceway surfaces and rolling contact surfaces in a cross-sectional view, or in other words, the contour lines of the raceway surfaces and rolling contact surfaces.

Here, it is preferred that the opposite ends adjacent to the center section of the raceway surface be formed into a convex shape by the second generatrices having a fixed radius of curvature R2 such that the opposite ends are separated from the rolling contact surface of the rolling element, or it is preferred that the opposite ends adjacent to the center section of the raceway surface are formed into a concave shape by the second generatrices having a radius of curvature R2 that is larger than the fixed radius of curvature R1 such that the opposite ends are separated from the rolling contact surface of the rolling element.

With the tapered roller bearing constructed as described above, neither end of the rolling element comes in strong localized contact with the raceway surface of the inner or outer race, even when a large load acts on the bearing causing the axes of the inner and outer races to shift with respect to each other, and thus it becomes difficult for edge loading to occur. In other words, it is possible to allow relative inclination between the inner and outer races. Differing from a self aligning roller bearing, the radius of curvature R1 of the first generatrices of the outer race is located further from the center axis of the bearing. And this is extremely effective in relieving the edge loading. Also, even in the case where the relative inclination between the inner and outer races is small or non-existent, contact between the raceway surface and the rolling contact surface becomes the contact between the concave generatrices and corresponding convex generatrices, and the radius of curvature R3 of the rolling contact surface and the radius of curvature R1 of the first generatrices are regulated by the specified relationship given by Equation [1], so that it is possible to suppress an increase in surface pressure between the raceway surface and rolling contact surface.

Here, the value 's', which regulates the radius of curvature R3 of the rolling contact surface, is greater than 0.65, so that it is possible to suppress an increase in the contact surface pressure in the center section of the raceway surface and rolling contact surface. Moreover, the value 's', which regulates the radius of curvature R3 of the rolling contact surface, is less than 0.95, so that it is possible to keep the contact surface pressure between the end section of the rolling element and the raceway surface up to 4 GPa, and thus it is possible to prevent early flaking of the raceway surface caused by edge loading.

Also, when the length in the axial direction of the center section of the race-raceway surface is taken to be L1 and the length in the axial direction of the rolling element is taken to be L2, then it is preferred that length L1 in the axial direction of the center section satisfies Equation [2] below.

$$L1 = t \times L2 \text{ Where } 0.4 \leq t \leq 0.8 \qquad \text{Eq. [2]}$$

By doing this, it is possible to smooth out the connecting section through which the center section of the raceway is continued to the opposite ends of the raceway, or in other words through which the first and second genratrices having radii of curvature R1, R2 are connected to each other, so that a good race surface (raceway surface) is provided in the arc processing.

This connecting section can also be formed by smoothly connecting the first generatrices and the second generatrices to each other at their border, or by performing chamfering along the border between the first generatrices and second generatrices. In order to suppress a rise in surface pressure at the border between the first and second genratrices having different radii of curvature R1, R2, it is possible to adopt a form, for example, where the first and second genratrices share the same tangent line.

Preferred embodiments of the invention will be explained based on the attached drawings. FIG. 1 is a partial cross-sectional drawing of a single-row tapered roller bearing 30 of a first embodiment of the invention. This tapered roller bearing 10 comprises an inner race 1 land outer race 12, such that the raceway surface 20 of the inner race 11 is formed into a convex-concave shape by first genratrices 20a and second genratrices 20b, while the raceway surface 21 of the outer race 12 is formed into a convex-concave shape by first generatrices 21a and second generatrices 21b. A plurality of substantially tapered rollers 15 are located between the convex-concave-shaped raceway surface 21 of the outer race 12 and the convex-concave-shaped raceway surface 20 of the inner race 20.

The rollers 15 are formed with a length L2 in the axial direction, and the rolling contact surface is formed by generatrices having a fixed radius of curvature R3. Here, the length L2 in the axial direction of the rollers 15 is taken to be 16 mm, and the radius of curvature R3 of the rolling contact surface is taken to be 190 mm.

A large collar 13 and a small collar 14, between which the rollers 15 are held, are formed on the inner race 11.

For the convex-concave-shaped raceway surfaces 20, 21 of the inner race 11 and outer race 12, the center sections of the raceway surfaces are formed into a concave shape having a length L1 in the axial direction by first genratrices 20a, 21a having a radius of curvature R1, and the opposite ends of the raceway surfaces that are adjacent to the center sections are formed into a convex shape by second genratrices 20b, 21b having a radius of curvature R2. For these convex-concave-shaped raceway surfaces 20, 21, the radius of curvature R1 of the first genratrices 20a, 21a is set to be very slightly greater than the radius of curvature R3 of the rolling contact surface of the rollers 15, and the radius of curvature R2 of the second genratrices 20b, 21b is set to be a little larger than the radius of curvature R1 of the first genratrices 20a, 21a. The first genratrices 20a, 21a share the same tangent line as the second genratrices 20b, 21b at the border between them. The radius of curvature R2 of the second genratrices 20b, 21b can be less than that of the first genratrices 20a, 21a.

Here, the length L1 in the axial direction of the center section of the convex concave-shaped raceway surfaces 20, 21 of the inner race 11 and outer race 12 is taken to be 10 mm, the radius of curvature R1 that forms the first genratrices 20a, 21a is taken to be 200 mm, and the radius of curvature R2 that forms the second genratrices 20b, 21b is taken to be 150 mm.

For the tapered roller bearing 10 described above, the radius of curvature R3 of the tolling elements satisfies Equation [1] below. Also, the length L1 of the center sections of the raceway surfaces satisfies Equation [2] below.

$$R3 = 0.95 \times R1 \qquad \text{Eq. [1]}$$

$$L1 = 0.60 \times L2 \qquad \text{Eq. [2]}$$

In the case of the tapered roller bearing 10 constructed as described above, there is no strong localized force in contact between the opposite ends of the rollers 15 and the raceway surfaces 20, 21 of the inner and outer races 11, 12, even when a large load acts on the bearing causing the axes of the inner race 11 and outer race 12 to shift, and thus it is difficult for edge loading to occur. In other words, it is possible to allow relative inclination between the inner and outer races 11, 12. The radius of curvature R1 of the first generatrices 21a of the outer race 12 is located further away from the center axis of the bearing than in the case of a self-aligning roller bearing. However, this very effectively relieves edge loading. Moreover, in the case when the relative inclination between the inner and outer races 11, 12 is small or non-existent, the contact between the race-raceway surfaces 20, 21 and the rolling contact surfaces of the rollers 15 becomes contact between the concave generatrices and the corresponding convex generatrices, so that it is possible to suppress an increase of surface pressure between the raceway surfaces and rolling contact surfaces.

Figure 2:
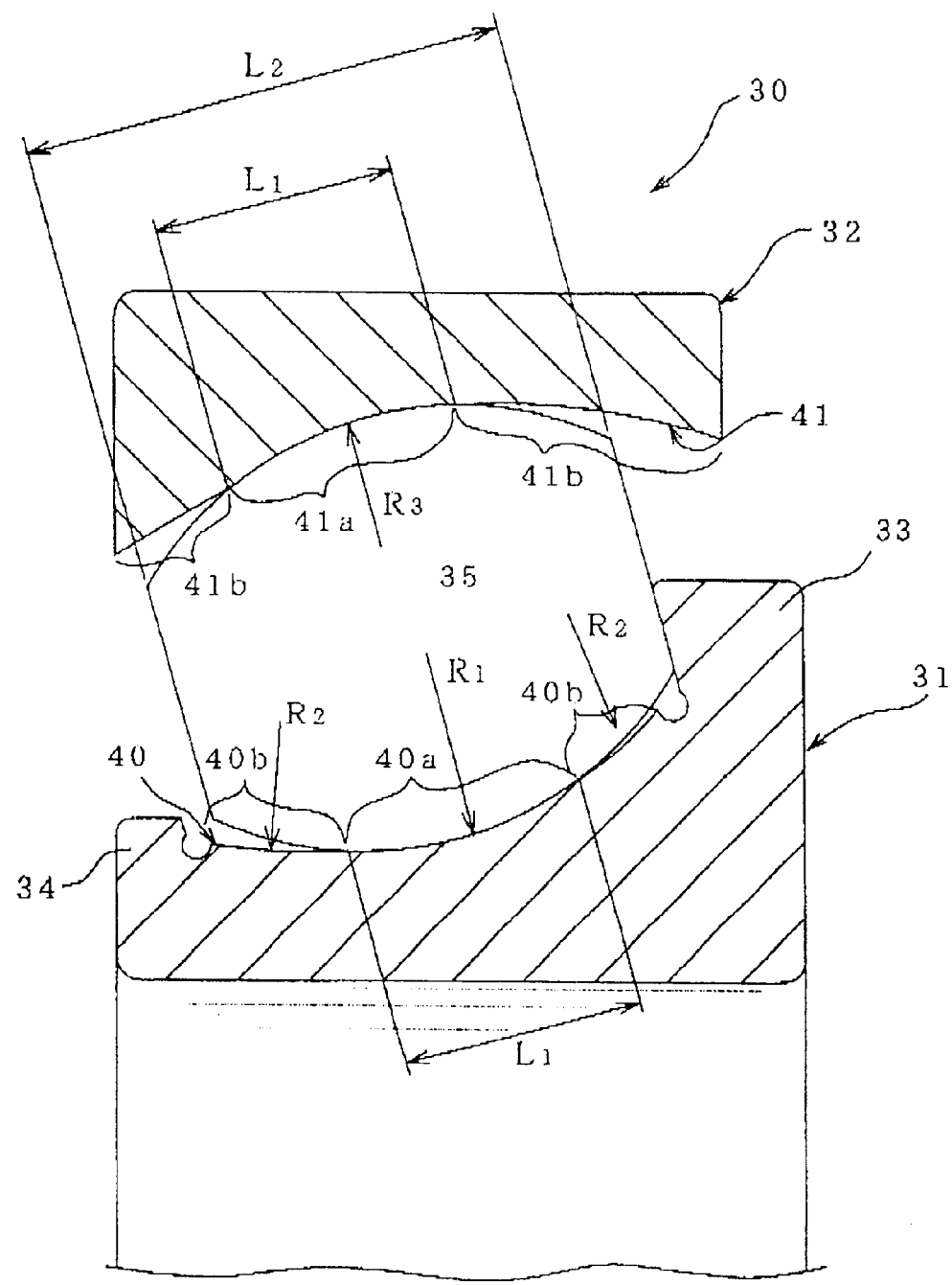
FIG. 2 is a partial cross sectional view of a second embodiment of the present invention where a tapered roller bearing 30 is shown.

FIG. 2 is a partial cross-sectional drawing of a single-row tapered roller bearing 30 of a second embodiment of the invention. For this tapered roller bearing 30, the raceway 40 of the inner race 31 is formed into a concave shape by first generatrices 40a and second generatrices 40b, and the raceway 41 of the outer race 32 is formed into a concave shape by first generatrices 41a and second generatrices 41b. There are a plurality of substantially tapered rollers 35 located between the concave-shaped raceway 41 of the outer race 32 and the concave-shaped raceway 40 of the inner race 31. The rollers 35 are formed to have a length L2 in the axial direction, and the rolling contact surfaces are formed by generatrices having a fixed radius of curvature R3. A large collar 33 and a small collar 34, between which the rollers 35 are held, are formed on the inner race 31.

For the concave raceway surfaces 40, 41 of the inner race 31 and outer race 32, the radius of curvature R1 of the first genratrices 40a, 41a is set to be very slightly greater than the radius of curvature R3 of the rolling contact surfaces of the rollers 35, and the radius of curvature R2 of the second genratrices 40b, 41b are set to be a little greater than the radius of curvature R1 of the first genratrices 40a, 41a. The first genratrices 40a, 41a and the second genratrices 40b, 41b are formed such that they share the same tangent line at the border between them.

The desired effects are obtained with this tapered roller bearing 30 as well. In other words, even when the opposite ends of the raceway surfaces are formed into a convex shape by second generatrices having a radius of curvature R2 that is larger than the radius of curvature R1, the same function and effect as in the case of the first embodiment described above are obtained. Also, the raceway surface of the inner race 31 can be formed into a convex-concave shape as in the case of the raceway surface of the outer race in the first embodiment. The other construction and functions of the bearing that are not explained here are substantially the same as those of the first embodiment described above.

EXAMPLE

Figure 3:
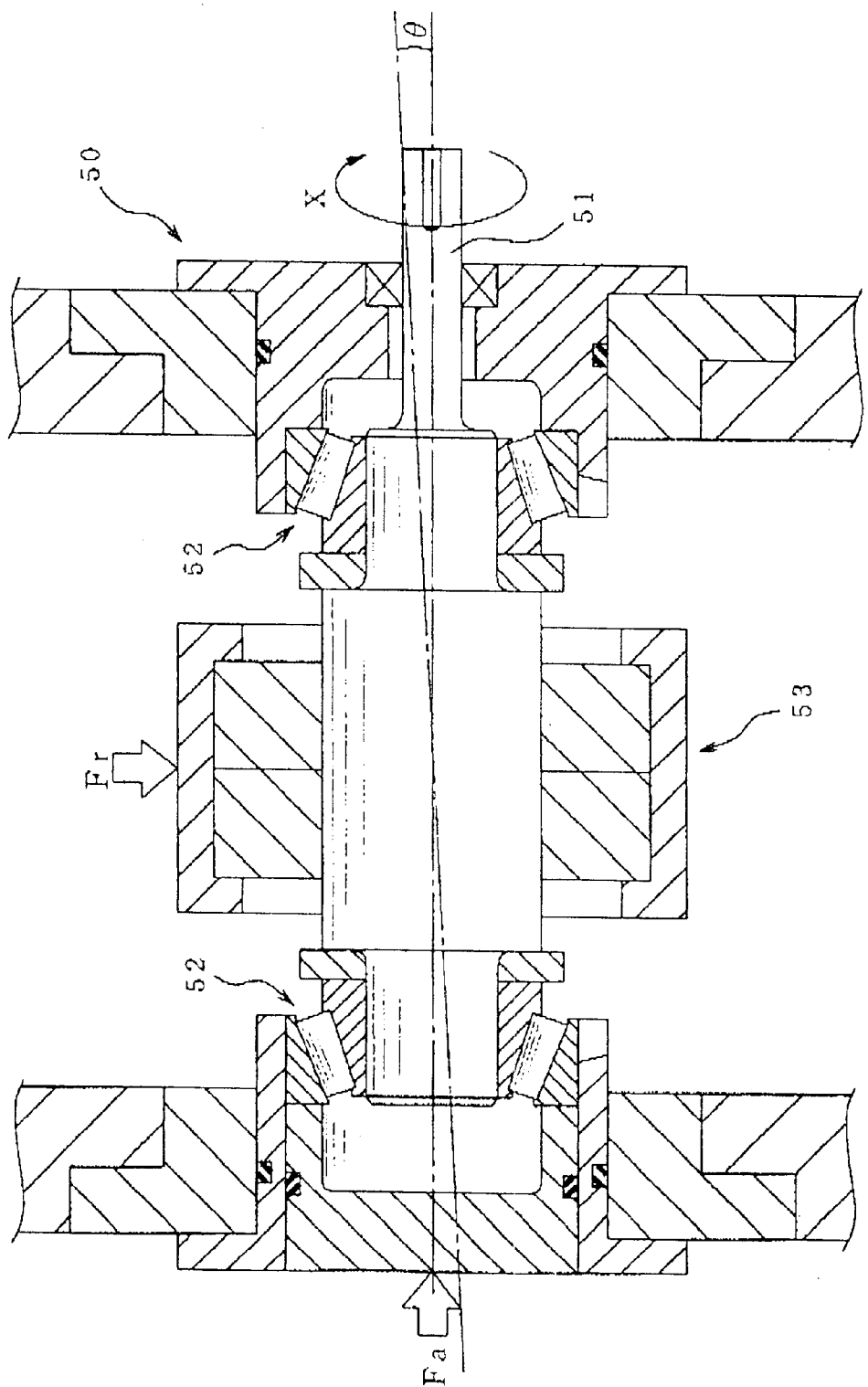
FIG. 3 is a diagrammatic cross sectional view of an endurance test apparatus 50 for the tapered roller bearing.

In the case of the tapered roller bearing of the invention described above, in order to confirm the effects obtained when the radius of curvature R3 of the rolling elements satisfies Equation [1] below, and the length L1 of the center section of the raceway surfaces satisfies Equation [2] below, an endurance tester 50 for tapered roller bearing as shown FIG. 3 was used to perform the following test.

$R3 = s \times R1$ Where $0.65 \leq s \leq 0.95$  Eq. [1]

$L1 = t \times L2$ Where $0.4 \leq t \leq 0.8$  Eq. [2]

In this endurance tester 50 for tapered roller bearing, a support bearing 53 is mounted on the shaft 51, and by mounting two test bearings 52 on the shaft 51 on the opposite sides of the support bearing 53, it is possible to test both bearings at the same time.

The bearing used in this for the tapered roller bearing 10 of the first embodiment shown in FIG. 1 was equivalent to NSK bearing number: 32208J (80 mm outer diameter×40 mm inner diameter, roller length L2=16 mm, basic dynamic load rating load C=77,000 N, basic static rating load CO=90,500 N).

As the test method, an endurance test was performed by applying a 20,000 N radial load Fr to the support bearing 53 of the endurance tester 50 for tapered roller bearing, and applying a 15,000 N axial load Fa in the axial direction of the shaft 51, then applying an equivalent dynamic load of P=32,000 N (P/C=0.42) with the shaft 51 inclined at an angle θ of 0.003 (10 minutes), and rotating the shaft 51 in the direction X shown in the figure at 3,000 rpm.

The number of tests performed was N=10 for each condition, and the test was stopped as soon as vibration reached a value that was five times the initial vibration, and the raceway surfaces were checked for flaking. The total life on calculation was Lcal=100 hours, so the finish time was set at 200 hours.

Gear Oil 755-90 (SAE viscosity: SAE J306) was used as the lubrication oil, and high-carbon chrome bearing steel (SUJ2) was used as the bearing material, and the bearing underwent normal heat processing.

Table 1 gives a summary of the parameters for the tapered roller bearing of this invention and a conventional bearing that was used as a comparison.

For the values shown in Table 1, R1 (mm) is taken to be the radius of curvature that forms the first generatrices of the center section of the raceway surfaces, R2 (mm) is taken to be the radius of curvature that forms the second generatrices that is located on the opposite ends of the raceway surfaces that are adjacent to the center section, and R3 (mm) is taken to be the radius of curvature of the rolling contact surfaces of the rollers. Also, L1 (mm) is taken to be the length in the axial direction of the center section of the raceway surfaces. Here, the value 's' in Equation [1] given above is the ratio R3/R1, and the value 't' in Equation [2] is the ratio L1/L2. Furthermore, here the evaluation time and whether or not flaking occurred in the raceway surfaces were checked.

A regular bearing (with only normal crowning) was used in comparison example 1. Also, with the sections where flaking occurred during the test, the flaking occurred at nearly the same rate for the inner race, outer race and rollers.

TABLE 1

| Example No. | radius of curvature R1 | radius of curvature R2 | radius of curvature R3 | S = R3/R1 | axial length L1 |
|---|---|---|---|---|---|
| 1 | 200 | 150 | 190 | 0.95 | 10 |
| 2 | 200 | 150 | 160 | 0.80 | 10 |
| 3 | 200 | 150 | 130 | 0.65 | 10 |
| 4 | 150 | 200 | 140 | 0.93 | 8 |
| 5 | 150 | 200 | 120 | 0.80 | 8 |
| 6 | 150 | 200 | 100 | 0.67 | 8 |
| 7 | 200 | 150 | 180 | 0.9 | 13 |
| 8 | 200 | 150 | 180 | 0.9 | 9.5 |
| 9 | 200 | 150 | 180 | 0.9 | 6 |

| Example No. | t = L1/L2 | evaluation time (L10 life) | flaking or not |
|---|---|---|---|
| 1 | 0.6 | 115 | 5/10 edge load |
| 2 | 0.6 | 200 or more | no-flaking |
| 3 | 0.6 | 148 | 3/10 flaking in center |
| 4 | 0.5 | 123 | 5/10 edge load |
| 5 | 0.5 | 200 or more | no-flaking |
| 6 | 0.5 | 154 | 3/10 flaking in center |
| 7 | 0.8 | 186 | 2/10 flaking in center |

TABLE 1-continued

| 8 | 0.6 | 200 or more | no-flaking |
| 9 | 0.4 | 192 | 2/10 flaking in center |

| Comparative Example No. | radius of curvature R1 | radius of curvature R2 | radius of curvature R3 | S = R3/R1 | axial length L1 |
| --- | --- | --- | --- | --- | --- |
| 1 | ∞ | ∞ | ∞ | 1 | 16 |
| 2 | 200 | 150 | 195 | 0.98 | 10 |
| 3 | 200 | 150 | 100 | 0.50 | 10 |
| 4 | 200 | 150 | 160 | 0.80 | 15 |
| 5 | 200 | 150 | 160 | 0.80 | 5 |

| Comparative Example No. | t = L1/L2 | evaluation time (L10 life) | flaking or not |
| --- | --- | --- | --- |
| Comparative 1 | 1 | 14 | 10/10 edge load |
| Example 2 | 0.6 | 58 | 10/10 edge load |
| 3 | 0.6 | 49 | 10/10 flaking in center |
| 4 | 0.9 | 25 | 10/10 surface defect |
| 5 | 0.3 | 23 | 10/10 surface defect |

As in Table 1;

In example 1, s=0.95 and t=0.6 (L1=10 mm) when R1=200 mm, R2=150 mm and R3=190 mm.

In example 2, s=0.80 and t=0.6 (L1=10 mm) when R1=200 mm, R2=150 mm and R3=160 mm.

In example 3, s=0.65 and t=0.6 (L1=10 mm) when R1=200 mm, R2=150 mm and R3=130 mm.

In example 4, s=0.93 and t=0.5 (L1=8 mm) when R1=150 mm, R2=200 mm and R3=140 mm.

In example 5, s=0.80 and t=0.5 (L1=8 mm) when R1=150 mm, R2=200 mm and R3=120 mm.

In example 6, s=0.67 and t=0.5 (L1=8 mm) when R1=150 mm, R2=200 mm and R3=120 mm.

In example 7, s=0.9 and t=0.8 (L1=13 mm) when R1=200 mm, R2=150 mm and R3=180 mm.

In example 8, s=0.9 and t=0.6 (L1=9.5 mm) when R1=200 mm, R2=150 mm and P3=180 mm.

In example 9, s=0.9 and t=0.4 (L1=6 mm) when R1=200 mm, R2=150 mm and R3=180 mm.

In comparative example 1, s=1 and t=(L1=16 mm) when R1=∞, R2=∞ and R3=∞.

In comparative example 2, s=0.85 and t=0.6 (L1=10 mm) when R1=200 mm, R2=150 mm and R3=195 mm.

In comparative example 3, s=0.50 and t=0.6 (L1=10 mm) when R1=200 mm, R2=150 mm and R3=100 mm.

In comparative example 4, S=0.80 and t=0.9 (L1=15 mm) when R1=200 mm, R2=150 mm and R3=160 mm.

In comparative example 5, s=0.80 and t=0.3 (L1=5 mm) when R1=200 mm, R2=150 mm and R3=160 mm.

As seen in the results above, in examples 2, 5 and 8, no flaking occurred on any of the raceway surfaces of the bearing even after 200 hours. This is because curvature relation of the rollers and races is an optimum value (R3/R1=0.8 to 0.9) even in the test when inclination was added, and because the rolling contact surfaces are made smooth by making the ratio L1/L2=0.5 to 0.6 even at the connecting area between the comosite arcs.

In examples 1 and 4, the evaluation time (L10 life) was 115 and 123 hours, respectively, and longer than the life on calculation. This is because the curvature relation of the rollers and races was R3/R1=0.95 and 0.93 and large, and in this test, with the angle of inclination θ set 10 minutes, edge loading occurred in 5 out of 10 bearings.

In examples 3 and 6, the L10 life was 148 and 154 hours, respectively, and longer than the life on calculation. This is because the curvature relation of the rollers and races was R/R1=0.65 and 0.67, and in this test where there was a kind of point contact and the inclination angle θ was 10 minutes, edge loading did not occur. However, the contact surface pressure in the center section increased, so internally originating flaking occurred in 3 out of 1.0 bearings.

In examples 7 and 9, the L10 life was 186 and 192 hours, respectively, and longer than the life on calculation. Since the curvature relation was R3/R1=0.9, the occurrence of edge loading was not particularly noticed. However, at the point of connection area between composite arcs, L1/L2=0.8 and 0.4, so non-smooth rolling contact surfaces occurred in the center section of the raceway surfaces of 2 out of 10 bearings, and surface originating flaking occurred.

On the other hand, in comparison example 1, evaluation was performed using a normal bearing, so in this test when the inclination angle was 10 minutes, the L10 life of all bearings was 1.4 hours, or approximately 1/7 of the calculated life, and flaking due to edge loading occurred in all bearings.

In comparison examples 2 and 3, the L10 life was 58 and 49 hours, respectively, or approximately ½ of the calculated life. In comparison example 2, the curvature relation of the rollers and races was R3/R1=0.98, that is the greatest value, and flaking due to edge loading occurred in all of the bearings. In comparison example 3, the curvature relation of the rollers and eway races was R3/R1=0.5, that is the lowest value, and contact surface pressure in the center section became extremely high, and internally originating flaking occurred in all of the bearings.

In comparison examples 4 and 5, the L10 life was 25 and 23 hours, respectively, or approximately ¼ of the calculated life. The curvature relation R3/R1=0.8 was sufficient, so edge loading was not noticed to have occurred in the tested parts. However, at the connection area between composite arcs, L1/L2=0.9 and 0.3, respectively, so there were non-smooth rolling contact surfaces in the center sections of the raceway surfaces in all of the races, and surface originating flaking occurred within a short period of time.

From the test results, it was found that by setting the value 's' to 0.65 to 0.95, and preferably to 0.8 to 0.9, and setting the value 't' to 0.4 to 0.8, and preferably to 0.5 to 0.6, it is possible to suppress flaking due to edge loading, as well as flaking in the center section of the raceway surfaces due to excessive contract surface pressure, and surface originating flaking due to surface processing error.

In this test, the surface roughness of the raceway surface of the races and of the rolling contact surface of the rolling elements in the bearing was 0.1 to 0.3 μmRa. However by making the surface roughness of the raceways 0.05 μmRa, it is possible to smooth out the connection area where the first and second genratrices having radii of curvature R1 and R2 of composite raceway surfaces are connected to each other, and thus in arc processing it is possible to provide a good race surface. Moreover, in the case of large bearing sizes, the surface roughness of the raceways may be about 0.5 μmRa. In this case it is preferred that the bearing be used under conditions where oil film parameter Δ, that is the judgment reference of the lubrication film, be greater than 1.

This invention is not limited to the embodiments described above, and can be appropriately changed or improved.

In the embodiments of the invention described above, high-carbon chrome bearing steel(SAES2100) was used as the bearing material for the endurance testing, however, the invention is not limited to this, and similar results can be obtained when used together with a case hardened steel, which has long life in an environment of foreign matter.

With the tapered roller bearing of this invention described above, it is possible to suppress edge loading even when the shift angle of the axis lines of the outer race and inner race is small, as well as it is possible to suppress an increase in surface pressure in the center section of contact area between the track surfaces and the rolling contact surfaces of the rollers.

What is claimed is:

1. A tapered roller bearing having a center axis, comprising:

an outer race having an inner peripheral surface with a raceway surface formed therearound in a concave shape in on axial direction;

an inner race having an outer peripheral surface with a raceway surface formed therearound in a concave shape in the axial direction; and a plurality of rolling elements having a rolling contact surface and located between the raceway surfaces so that the rolling contact surface is defined by third generatrices having a fixed radius of curvature $R3$ to be convex in the axial direction;

wherein the raceway surfaces have a center section and opposite ends in the axial direction adjacent to the center section, wherein the center section is defined by first generatrices having a fixed radius of curvature $R1$ in a concave-shape in the axial direction and that the radius of curvature $R1$ of the outer race is located away from the center axis of the tapered roller bearing, wherein the opposite ends are defined by second generatrices having a fixed radius of curvature $R2$ such that the opposite ends separate from the rolling contact surface of the rolling element; and wherein the radius of curvature $R3$ of the rolling contact surface satisfies Equation [1] below:

$$R3 = s \times R1 \text{ wherein } 0.65 \leq s \leq 0.95 \qquad \text{Eq. [1]}.$$

2. The tapered roller bearing of claim 1, wherein provided that the length in the axial direction of the center section of the raceway surfaces is taken to be $L1$ and that the length in the axial direction of the rolling elements is taken to be $L2$, length $L1$ in the axial direction of the center section satisfies Equation [2] below:

$$L1 = t \times L2 \text{ wherein } 0.4 \leq t \leq 0.8 \qquad \text{Eq. [2]}.$$

3. The tapered roller bearing of claim 1, further comprising a first smaller collar and a second larger collar provided on said outer peripheral surface of said inner race for holding said rolling elements therebetween, said raceway surface of said inner race formed between the first small and second larger collars.

* * * * *